United States Patent [19]

Harford

[11] 4,408,229
[45] Oct. 4, 1983

[54] NOISE SENSITIVITY REDUCTION APPARATUS FOR A TV RECEIVER AGC SYSTEM

[75] Inventor: Jack R. Harford, Flemington, N.J.

[73] Assignee: RCA Corporation, New York, N.Y.

[21] Appl. No.: 268,497

[22] Filed: May 29, 1981

[51] Int. Cl.³ .............................................. H04N 5/52
[52] U.S. Cl. ................................................... 358/177
[58] Field of Search ................ 358/177, 174; 330/281; 328/139

[56] References Cited

U.S. PATENT DOCUMENTS 4,237,487 12/1980 Ikeda et al. ........................... 358/177
4,292,598 9/1981 Yasumura ............................. 358/177

OTHER PUBLICATIONS

Philips Technical Information Brochure No. 034, (1977), entitled "TDA 2540 and TDA 2541–New Vision IF ICs".

Primary Examiner—Richard Murray
Attorney, Agent, or Firm—Eugene M. Whitacre; Paul J. Rasmussen; William H. Meagher

[57] ABSTRACT

The composite video signal input to the voltage comparator of a TV receiver AGC system is subjected to the filtering action of a low pass filter for noise suppression purposes. A wideband signal path, bypassing the low pass filter, is enabled during trailing edges of noise impulses exceeding the normal sync peak level, in order to substantially preclude delay of the fall of said trailing edges.

7 Claims, 1 Drawing Figure

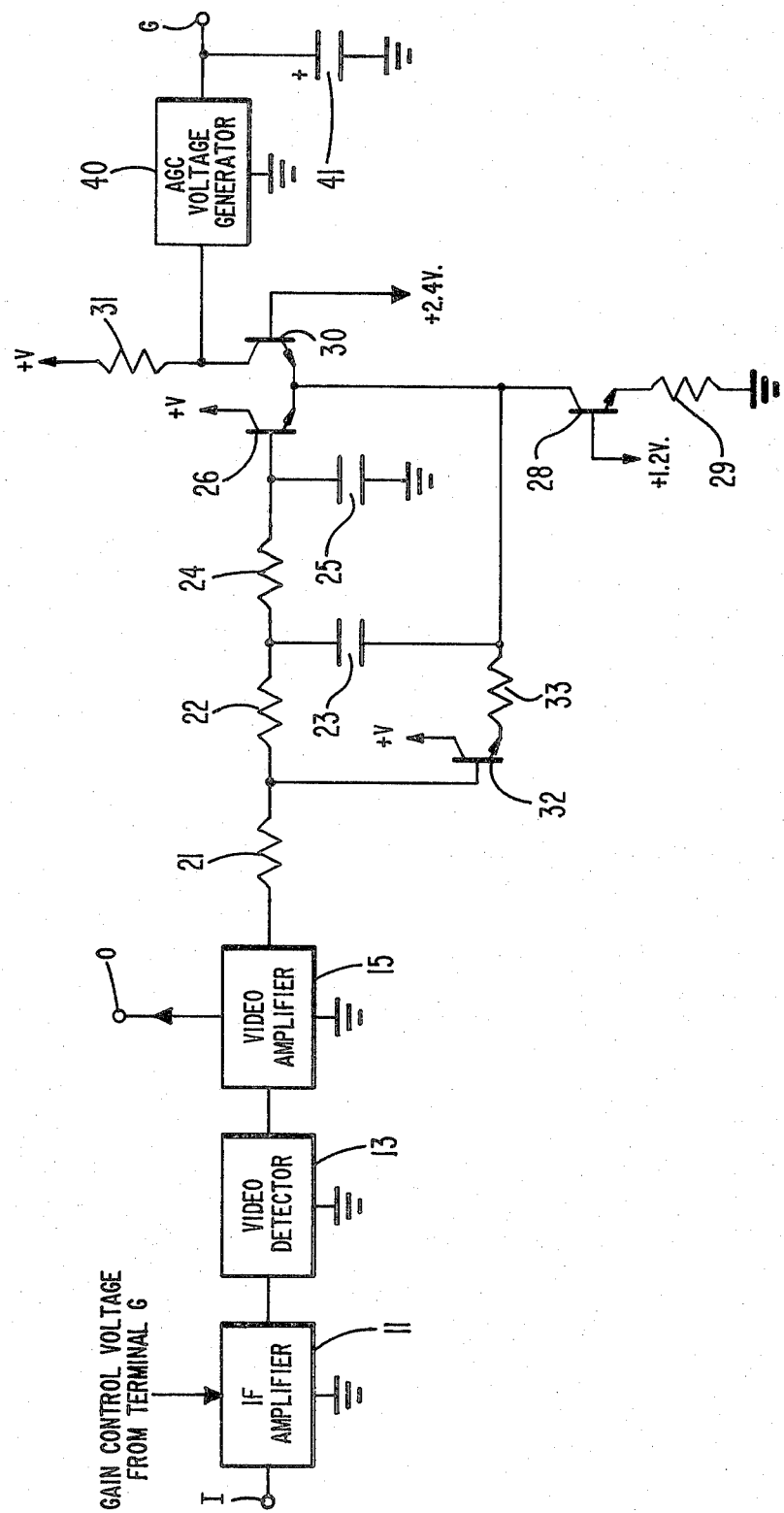

NOISE SENSITIVITY REDUCTION APPARATUS FOR A TV RECEIVER AGC SYSTEM

The present invention relates generally to automatic gain control (AGC) systems for a television receiver, and particularly to novel arrangements for reducing the sensitivity of such AGC systems to impulse noise.

In a known type of television AGC system, such as is described in a 1977 Philips Technical Information Brochure No. 034, entitled "TDA 2540 and TDA 2541-New Vision IF ICs", the peak sync level of received composite video signals is compared with a reference level in a voltage comparator. When the potential of the signal input exceeds the reference level, a change in the comparator output activates a current path to effect discharging of an AGC filter capacitor at a given rate. In the absence of such activation, charging of the AGC filter capacitor is effected via a separate current path at a lesser rate.

For high frequency noise suppression purposes, the composite video signal input to such a comparator desirably is subjected to the action of a low pass filter in its passage to the comparator. In order to allow for proper contribution of the narrow equalizing pulses of the composite video signal to AGC potential development, the cutoff frequency of the low pass filter is desirably sufficiently high as to allow the equalizing pulses in the filter output to reach the same peak level as the wider horizontal and vertical synchronizing pulses. Despite such a constraint on the low pass filter design, the filter presence can desirably result in (a) a reduction of the peak level attained by the (typically very narrow) impulses extending in the sync pulse direction that are introduced into the signal input by impulse noise, as well as in (b) a delay of the rise of the leading edge of the noise impulse beyond the reference level in the filter output. The delay is advantageous where, as in the circuitry described in the aforementioned brochure, a fast-acting noise detector is provided to alter the state of the filter capacitor discharging circuit, during the detection of noise presence, in a sense reducing the impact of the noise component of the signal input on the filter capacitor charge.

A disadvantage of the filter presence, however, is a delay of the fall of the trailing edge of the noise impulse below the reference level in the filter output, with a resultant stretching of the time the filtered noise impulse extends beyond the reference level. In AGC systems incorporating no noise protection of the state altering type described above, this stretching effect of the noise filter may worsen the deleterious impact of impulse noise on AGC potential development. Moreover, even in AGC systems incorporating noise protection of the state altering type described above, this stretching effect of the noise filter can result in the filtered noise impulse remaining beyond the reference level for a period of time after termination of the state alteration effected by the fast-acting noise detector, with the consequence of a partial defeat of the noise protection afforded by the operation of the latter system.

In accordance with the principles of the present invention, a noise filter arrangement is provided for the signal input to the comparator of a television AGC system which substantially avoids the above-described trailing edge delay disadvantage, while retaining the leading edge delay and peak reduction advantages of prior art noise filter arrangements. Pursuant to the principles of the present invention, a low pass filter for the signal input to the comparator has associated therewith wideband means for bypassing the low pass filter, with the wideband bypassing means effectively disabled during the leading edge of a noise impulse introduced into the signal input by impulse noise, but subject to enablement during the trailing edge of the noise impulse.

In accordance with an illustrative embodiment of the present invention, the low pass filtering of the signal input to the voltage comparator of a television AGC system is effected by an active filter comprising a first transistor having its base electrode connected via a pair of resistance elements to a video signal source, and via a first capacitor to a point of fixed potential, and its emitter electrode connected via a second capacitor to the junction of the pair of resistance elements. A filter bypassing path is provided by a second transistor disposed as an emitter-follower, with its base electrode connected to an intermediate point of the resistance element remote from said first transistor, and its emitter electrode coupled to the emitter electrode of the first transistor. The voltage comparator comprises a third transistor having its emitter electrode connected to the emitter electrode of the first transistor and returned to the point of fixed potential via the collector-emitter path of a current source transistor, its base electrode coupled to a source of reference potential, and its collector electrode coupled to an output load impedance.

In the accompanying drawing, the sole FIGURE illustrates, partially schematically and partially by block diagram representation, a portion of a television receiver incorporating an AGC system employing a noise filter arrangement in accordance with an embodiment of the present invention.

In the drawing, an IF amplifier 11 receives at its input terminal I the intermediate frequency signal output of the tuner (not illustrated) of a television receiver. The gain of the IF amplifier 11 is subject to control in accordance with variations of a gain control voltage developed at terminal G in a manner to be described subsequently. The output of the gain controlled IF amplifier is supplied for demodulation purposes to a video detector 13. Composite video signals recovered by detector 13 are subject to amplification in video amplifier 15. Amplified video signals are available at output terminal O of amplifier 15 for application to the receiver's video signal processing apparatus (not shown).

An additional output of the video amplifier 15 (comprising composite video signals with negative-going sync pulses) is coupled via a trio of serially connected resistors 21, 22, 24 to the base electrode of an NPN transistor 26, disposed in an emitter-follower configuration with its collector electrode directly connected to the positive terminal (+V) of an operating potential supply. A capacitor 23 is coupled between the junction of resistors 22 and 24 and the emitter electrode of transistor 26. An additional capacitor 25 is coupled between the base electrode of transistor 26 and a point of fixed potential (e.g., the grounded negative terminal of the operating potential supply).

An NPN transistor 30 is disposed with its emitter electrode directly connected to the emitter electrode of transistor 26, with its base electrode connected to a point of reference bias potential (e.g., +2.4 V.), and with its collector electrode connected via a load resistor 31 to the +V supply terminal. A current source for the interconnected emitter electrodes of transistors 26 and 30 is provided by an NPN transistor 28, with its collector electrode directly connected to the interconnected emitter electrodes, with its base electrode connected to a +1.2 volt bias potential point, and with its emitter electrode returned to ground via a resistor 29. An AGC voltage generator 40 (for example, of the general type described in the aforementioned brochure) provides control of the charging and discharging of a filter capacitor 41 (coupled between generator output terminal G and the grounded supply terminal) in response to the potential at the collector electrode of transistor 30 (in a manner described, for example, in the aforementioned brochure).

An additional NPN transistor 32 is disposed as an emitter-follower, with its base electrode connected to the junction of resistors 21 and 22, with its collector electrode directly connected to the +V supply terminal, and with its emitter electrode connected via a resistor 33 to the emitter electrode of transistor 26.

In operation of the illustrated circuit, resistors 21, 22, 24 cooperate with capacitors 23, 25 and transistor 26 to form an active second-order filter (of the general type disclosed, for example, on page 125 of the Active Filter Cookbook by D. Lancaster, published by Howard W. Sams & Co., Inc. in 1975). The filter introduces a delay of the rise (in the negative direction) of the leading edge of each synchronizing pulse, as well as a delay of the fall of the trailing edge of each synchronizing pulse. A lower limit on the cutoff frequency of the active filter is imposed by desired compliance with the requirement that the delays imposed do not prevent the (narrow) equalizing pulse components of the composite video signal output of the filter from attaining the same peak level as the wider synchronizing pulses.

The potential at the collector electrode of transistor 30 departs from a high potential state only when the (negative) peaks of the filter output drop below a threshold level, sufficiently below the +2.4 V. reference bias potential to permit conduction by transistor 30. Illustratively, discharging of filter capacitor 41 occurs only during such departures. In normal operation of the AGC system, the level of the peaks of the synchronizing pulses is stabilized at a level substantially equal to the aforesaid reference level.

When the illustrated receiver is subject to reception of impulse noise, resultant negative-going noise impulses, of typically shorter duration than the aforesaid equalizing pulses, can appear at the filter input with peaks extending well below the sync pulse peak level. A desirable effect of the active filter on such noise impulses is a delay in the rise (in the negative direction) of the leading edge of the noise impulse in the filter output to the threshold level. Such a delay can advantageously postpone disturbance of the potential at the collector of transistor by the filtered noise impulse until after a fast-acting noise detector (not shown) actuates a state alteration in the generator 40 for noise protection purposes.

To preclude an accompanying undesired delay in the fall (in a positive direction) of the trailing edge of the noise impulse, transistor 32 comes into action to enable a wide band path bypassing the active filter, the bypassing path comprising the base-emitter path of transistor 32 in series with resistor 33.

At the onset of the trailing edge of the noise impulse, the rapid fall (in the positive direction) at the filter input quickly results in the forward biasing of the base-emitter path of transistor 32, whereupon the potential at the emitter of transistor 26 follows, without significant delay, the rapid fall at the filter input, allowing transistor 30 to be quickly driven to cut off. The impact of the noise impulse on disturbance of proper AGC voltage generation is accordingly lessened relative to that possible if a delay of the fall of the trailing edge at the filter output was permitted to take place. In the instance of use of state alteration in generator 40 for noise protection purposes, the likelihood of continuation of a disturbance of the potential at the collector of transistor 30 beyond the termination of the state alteration is substantially precluded.

The ratio of resistance values for resistors 21 and 22 (i.e., the choice of bypass tap location on the first resistance of the active filter) is selected so as to confine the instances of activation of transistor 32 to the trailing edges of pulses of a peak level exceeding the normal sync peak level by an appropriate amount.

What is claimed is:

1. In a television receiver including an IF amplifier having a gain subject to control in accordance with a gain control potential supplied thereto, and a video detector responsive to the output of said gain controlled IF amplifier; an automatic gain control system comprising:
a low pass filter having an input and an output, and exhibiting a given cutoff frequency;
means responsive to an output of said video detector for supplying a composite video signal to said input of said low pass filter;
a source of reference potential;
voltage comparison means having a first input coupled to said source of reference potential and a second input coupled to said output of said low pass filter for developing an output variation when the potential at said second comparator input reaches a threshold potential related to said reference potential;
means having an input responsive to said output of said video detector, and having an output coupled to said second comparator input, for bypassing said low pass filter; said bypassing means being enabled only in the presence of a difference between the potentials at the input and output of said bypassing means of a given sense and of a magnitude exceeding a given magnitude; said bypassing means have a passband encompassing the passband of said low pass filter and extending beyond said cutoff frequency; and
means responsive to output variations of said voltage comparison means for developing said gain control potential.

2. Apparatus in accordance with claim 1, wherein said low pass filter comprises an active filter, and wherein said bypassing means includes a first transistor disposed as an emitter-follower and having a base electrode coupled to receive said composite video signals and an emitter electrode coupled to said filter output.

3. Apparatus in accordance with claim 2, wherein said active filter comprises a second transistor, having base and emitter electrodes, a first resistance and a second resistance connected in series between the output of said video signal supplying means and the base electrode of said second transistor, a first capacitance coupled between the junction of said first and second resistances and the emitter electrode of said second transistor, and a second capacitance coupled between the base electrode of said second transistor and a point of fixed potential; the output of said active filter appearing at said emitter electrode of said second transistor.

4. Apparatus in accordance with claim 3, wherein the base electrode of said first transistor is connected to an intermediate point of said first resistance.

5. Apparatus in accordance with claim 4, wherein said voltage comparison means includes a third transistor having a base electrode connected to said reference potential source, an emitter electrode connected to the emitter electrode of said second transistor, and a collector electrode connected to a load impedance across which said output variations of said voltage comparison means appear;

said apparatus also including a fourth transistor disposed as a current source coupled to the interconnected emitter electrodes of said second and third transistors. pg,10

6. Apparatus in accordance with claim 1, wherein said composite video signals supplied to said low pass filter input include periodic synchronizing pulses extending in a given direction to a peak desirably maintained at a given level during normal operation of said gain control system; said signals being undesirably subject to occasional accompaniment by noise impulses extending in said given direction beyond said given level; said given direction and given level being so related to said given sense and given magnitude that said bypassing means is subject to enablement during the appearance of the trailing edges of said noise impulses at said filter input.

7. Apparatus in accordance with claim 6 wherein said composite video signals supplied to said filter input include equalizing pulses of a width narrower than said periodic synchronizing pulses and of a peak level equal to the peak level of said synchronizing pulses, and wherein said given cutoff frequency is sufficiently high so that said equalizing pulses in the output of said filter attain substantially the same peak level as is attained by said wider synchronizing pulses.

* * * * *

UNITED STATES PATENT AND TRADEMARK OFFICE
CERTIFICATE OF CORRECTION

PATENT NO. : 4,408,229

DATED : October 4, 1983

INVENTOR(S) : Jack Rudolph Harford

It is certified that error appears in the above-identified patent and that said Letters Patent is hereby corrected as shown below:

Column 5, line 15, delete "pg.10".

Signed and Sealed this

Tenth Day of January 1984

[SEAL]

Attest:

GERALD J. MOSSINGHOFF

Attesting Officer

Commissioner of Patents and Trademarks